July 16, 1963
A. W. KAMMERER ETAL
3,097,708
RETRIEVABLE DRILLING APPARATUS
Filed May 11, 1959
5 Sheets-Sheet 1
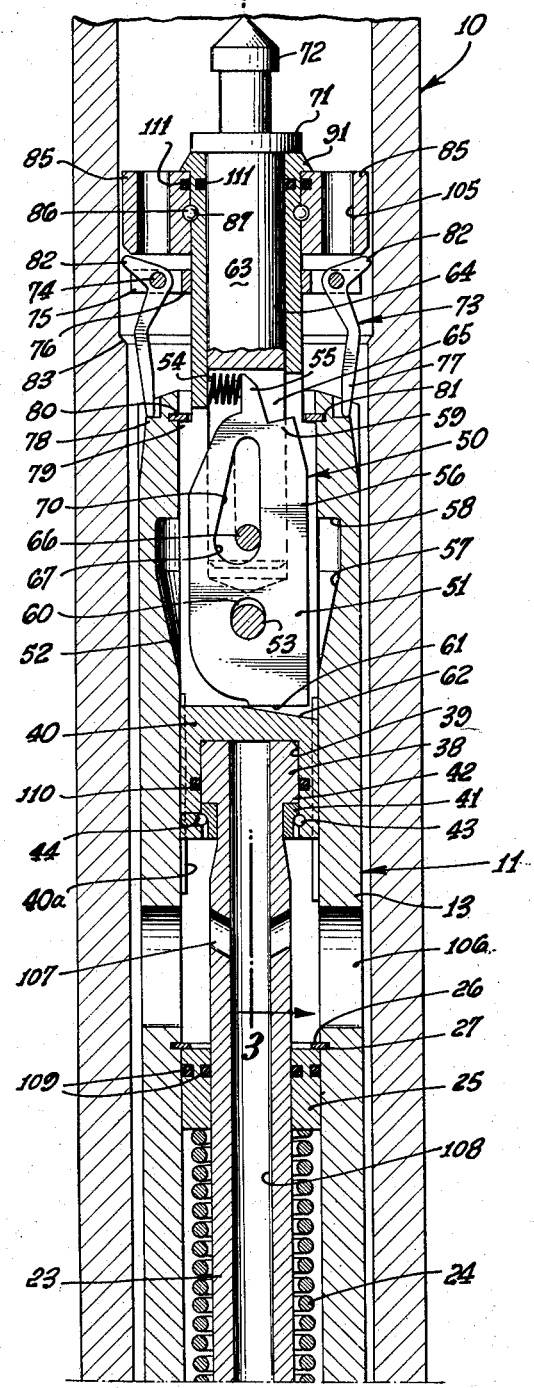
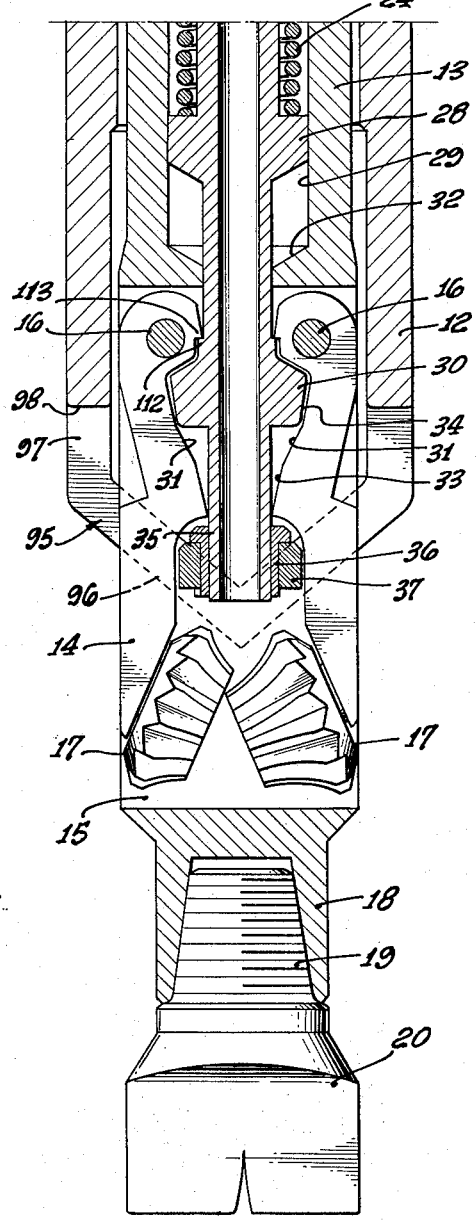
INVENTORS.
ARCHER W. KAMMERER
ARCHER W. KAMMERER, JR.
JEAN K. LAMPHERE
BY
Bernard Kriegel
ATTORNEY.

July 16, 1963

A. W. KAMMERER ETAL 3,097,708

RETRIEVABLE DRILLING APPARATUS

Filed May 11, 1959

INVENTORS.
ARCHER W. KAMMERER
ARCHER W. KAMMERER, JR.
JEAN K. LAMPHERE
BY
Bernard Kriegel
ATTORNEY.

July 16, 1963  A. W. KAMMERER ETAL  3,097,708
RETRIEVABLE DRILLING APPARATUS
Filed May 11, 1959  5 Sheets-Sheet 3

INVENTORS.
ARCHER W. KAMMERER
ARCHER W. KAMMERER, JR.
JEAN K. LAMPHERE
BY
Bernard Kriegel
ATTORNEY.

July 16, 1963  A. W. KAMMERER ETAL  3,097,708
RETRIEVABLE DRILLING APPARATUS
Filed May 11, 1959  5 Sheets-Sheet 4
FIG. 7.
FIG. 8.
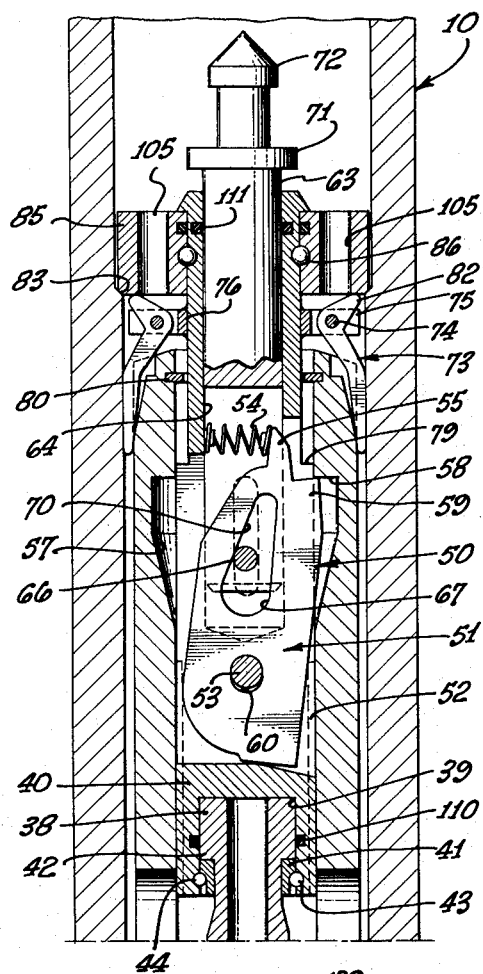
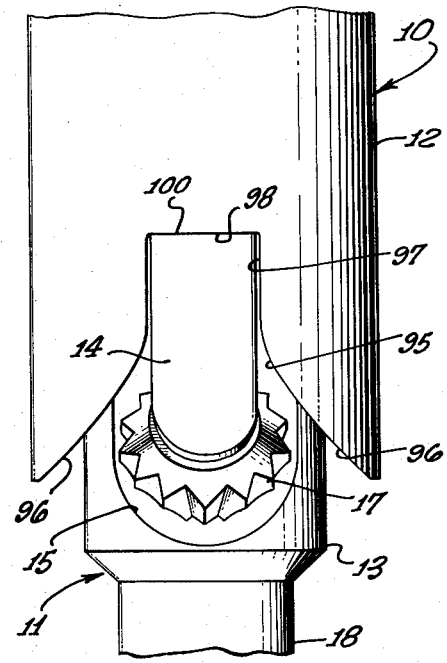
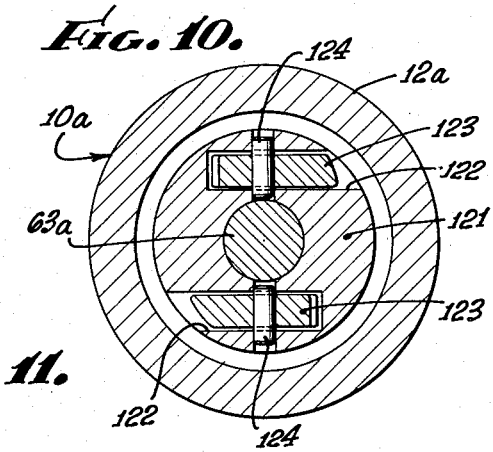
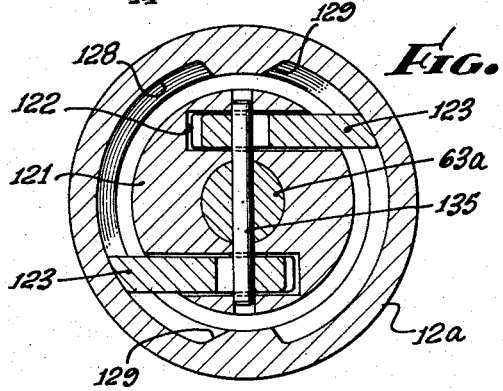
FIG. 10.
FIG. 11.
INVENTORS.
ARCHER W. KAMMERER
ARCHER W. KAMMERER, JR.
JEAN K. LAMPHERE
BY
Bernard Kriegel
ATTORNEY.

July 16, 1963
A. W. KAMMERER ETAL
3,097,708
RETRIEVABLE DRILLING APPARATUS
Filed May 11, 1959
5 Sheets-Sheet 5
*FIG. 9.*
*FIG. 9a.*
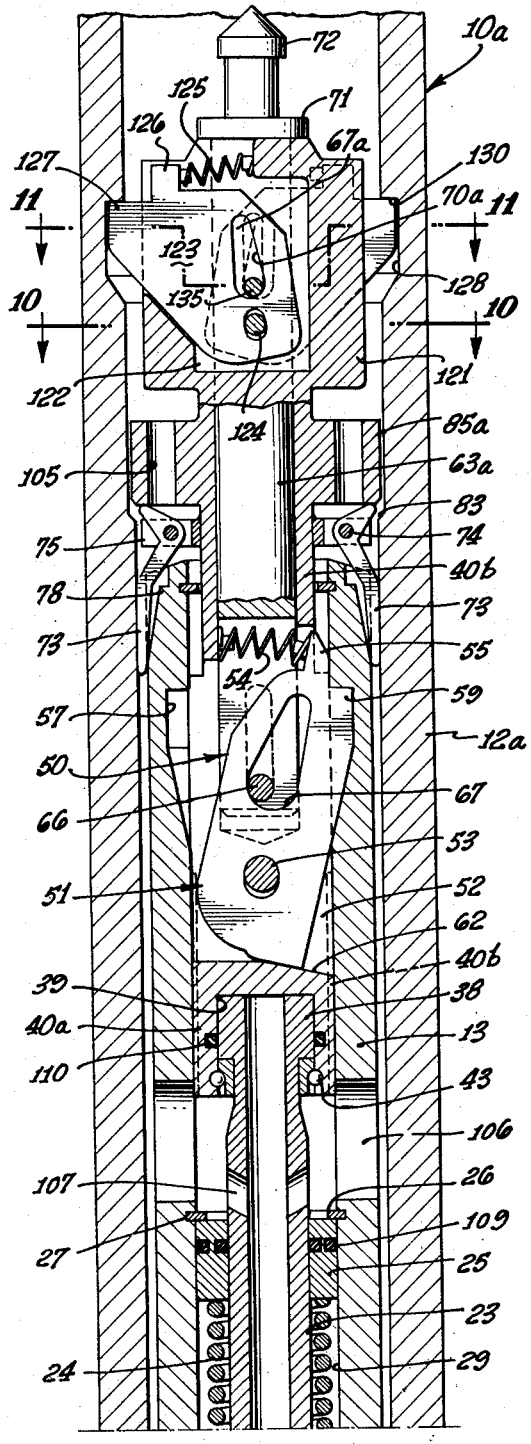
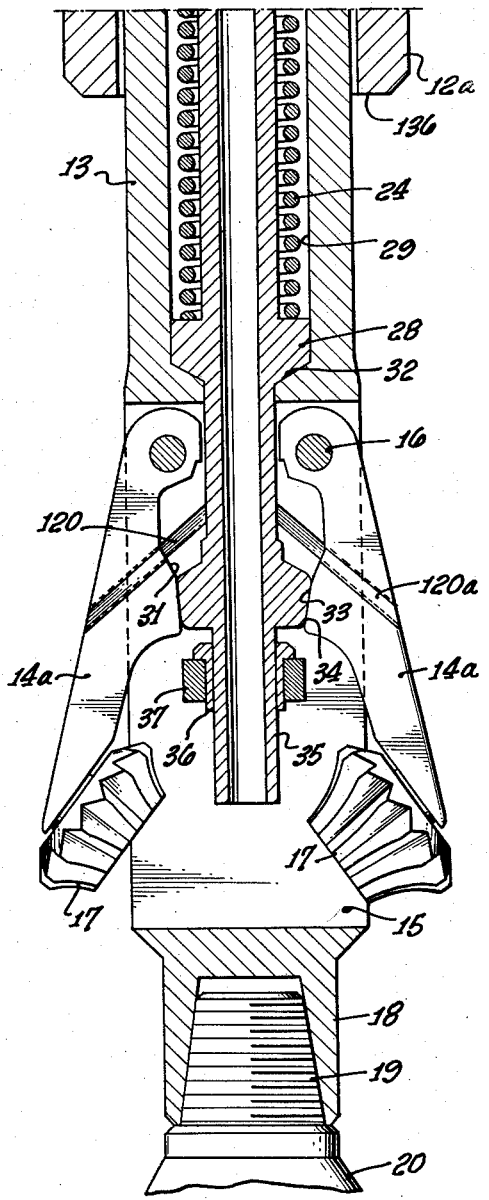
INVENTORS.
ARCHER W. KAMMERER
ARCHER W. KAMMERER, JR.
JEAN K. LAMPHERE
BY
Bernard Kriegel
ATTORNEY.

United States Patent Office 3,097,708
Patented July 16, 1963

---

3,097,708
RETRIEVABLE DRILLING APPARATUS
Archer W. Kammerer, Archer W. Kammerer, Jr., and Jean K. Lamphere, Fullerton, Calif., assignors, by mesne assignments, of three-fifths to said Archer W. Kammerer, one-fifth to said Archer W. Kammerer, Jr., and one-fifth to said Jean K. Lamphere
Filed May 11, 1959, Ser. No. 812,387
19 Claims. (Cl. 175—260)

The present invention relates to rotary drilling apparatus for well bores.

Oil, gas, water, sulphur and similar well bores have heretofore been drilled with a drill bit secured to the lower end of a string of drill pipe. As each bit becomes dull the drill pipe is removed from the well bore, another bit attached to it and the string of drill pipe relowered in the well bore. After the desired depth of hole has been produced, the drill pipe is removed and casing or the like is lowered in the hole, which may be cemented in place.

The necessity for frequent round trips to change the drill bit is a time consuming and costly operation. Potential damage to the well bore is also present due to pressures and the like developed in the drilling mud as a result of raising and lowering the string of drill pipe. There is also the danger of being unable to lower the casing in the drilled hole to the required depth, or in damaging the well formation during lowering of the casing.

An object of the present invention is to provide improved drilling apparatus that avoids the necessity for repeated round trips of the drilling string to change drill bits, the apparatus being capable of being lowered and removed through a string of pipe, that will form the ultimate casing for the well bore, and of being readily connected to the lower end of the pipe, which is then rotated to effect drilling of the hole, and of being released from the pipe and retrieved through its bore after the apparatus becomes dull or is to be retrieved for any other reason.

Another object of the invention is to provide a retrievable drilling bit capable of being lowered through a string of pipe to its lower end and of being rotationally coupled to the pipe, the drilling bit having cutters that are expandible outwardly beyond the outside diameter of the pipe without the necessity for resting the bit on the bottom of the hole being drilled.

A further object of the invention is to provide a retrievable drill bit of the character indicated that is positively coupled to the drill pipe after having been lowered through it.

An additional object of the invention is to provide a retrievable drill bit of the character indicated in which the drilling torque is transmitted directly from the string of pipe to the drill bit cutters, and in which the drilling weight is transmitted directly from the string of pipe to the cutters.

Yet another object of the invention is to provide a retrievable drill bit of the character indicated in which the cutters are positively locked in their outwardly expanded position.

Another object of the invention is to provide a retrievable drill bit in which the cutters are positively retracted from their expanded condition to facilitate withdrawal of the bit through the string of casing, or similar pipe, used to rotate the bit and drill the well bore.

Still a further object of the invention is to provide a retrievable drill bit adapted to be run through and releasably attached to the lower end of a casing string or other pipe string, in which the bit cutters have a relatively large range of expansion to cut a hole diameter substantially greater than the outside diameter of the casing string, so as to provide adequate clearance around the outside of the casing string for the circulation of drilling mud and the subsequent placement of cementitious material.

An additional object of the invention is to provide a retrievable drill bit having expandible cutters and adapted to be run through and coupled to a casing string or the like, the cutters being releasably latched in their expanded position so as to prevent their inadvertent partial or full retraction.

Yet a further object of the invention is to provide a retrievable drill bit having expansible cutters adapted to be releasably latched in their expanded position, in which the latching mechanism is not subject to the erosive, or any, action of the circulating drilling fluid.

Another object of the invention is to provide a retrievable drill bit adapted to be lowered through and coupled to a casing string and embodying a mandrel movable relatively to a bit body to effect expansion and retraction of the bit cutters, in which the drilling torque is transmitted from the casing through the mandrel to the bit body and cutters.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIGURES 1 to 1a together constitute a longitudinal section through a drill bit within and at the lower end of a string of casing or similar pipe, the apparatus being disposed in its position for lowering the drilling bit through the well pipe, FIG. 1a constituting a lower continuation of FIG. 1;

FIG. 7 is a longitudinal section similar to FIG. 1, disclosing the upper portion of the drill bit being released;

FIG. 8 is a side elevational view as seen along the line 8—8 on FIG. 2a;

Figure 2:
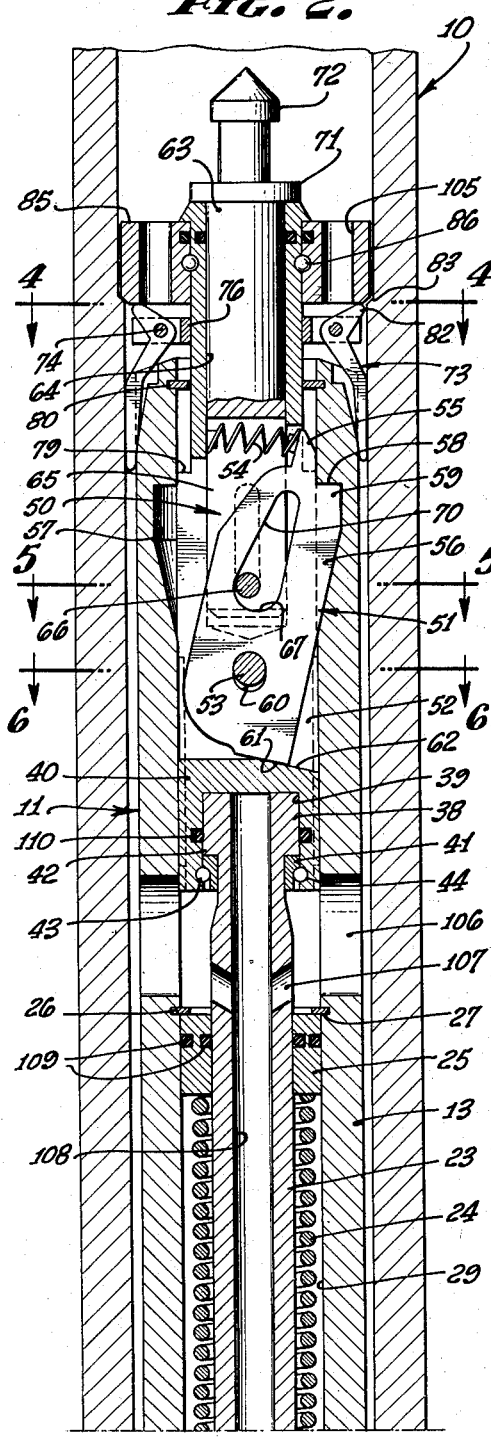
FIGS. 2 and 2a are views similar to FIGS. 1 and 1a with the drill bit cutters in expanded position and the drill bit coupled to the string of casing, FIG. 2a constituting a lower continuation of FIG. 2.

FIGS. 9 and 9a together constitute a longitudinal section through another embodiment of the invention with the cutters in expanded position, FIG. 9a constituting a lower continuation of FIG. 9;

FIG. 10 is a cross-section taken along the line 10—10 on FIG. 9;

FIG. 11 is a cross-section taken along the line 11—11 on FIG. 9.

The apparatus is disclosed in the drawings as including the lower portion of a string of well casing 10, or similar pipe, which extends to the top of the well bore being drilled, and which is rotated to transmit the drilling torque and the drilling weight to a retrievable drill bit portion 11 of the apparatus. The drill bit is movable down through the string of casing from the top of the hole and is releasably coupled to the lower portion 12 of the casing, after which drilling of the well bore can proceed through rotation of the string of casing 10 and its progressive downward movement as the hole is produced. During the rotating operation drilling mud or the like is pumped down through the interior of the casing 10, discharging from its lower portion or the drill bit 11, to carry the cuttings upwardly and around the string of casing to the top of the hole. When the drill bit 11 becomes dull, it is released from the casing string 10 and is withdrawn through its interior to the top of the hole, whereupon the same drill bit with new cutters, or another drill bit, is lowered through the casing and is locked in place. When the new cutters become dull the drill bit portion 11 of the apparatus is again withdrawn through the interior of the casing string 10 and the cutters are replaced. This action is repeated as often as necessary in drilling the hole to the desired depth. However, the casing 10 need never be withdrawn from the well bore. In fact, after the hole has been drilled to the desired depth, the casing can remain therein and be cemented in place, if desired, in substantially the same manner as casing strings are ordinarily cemented in a well bore.

Figure 2A:
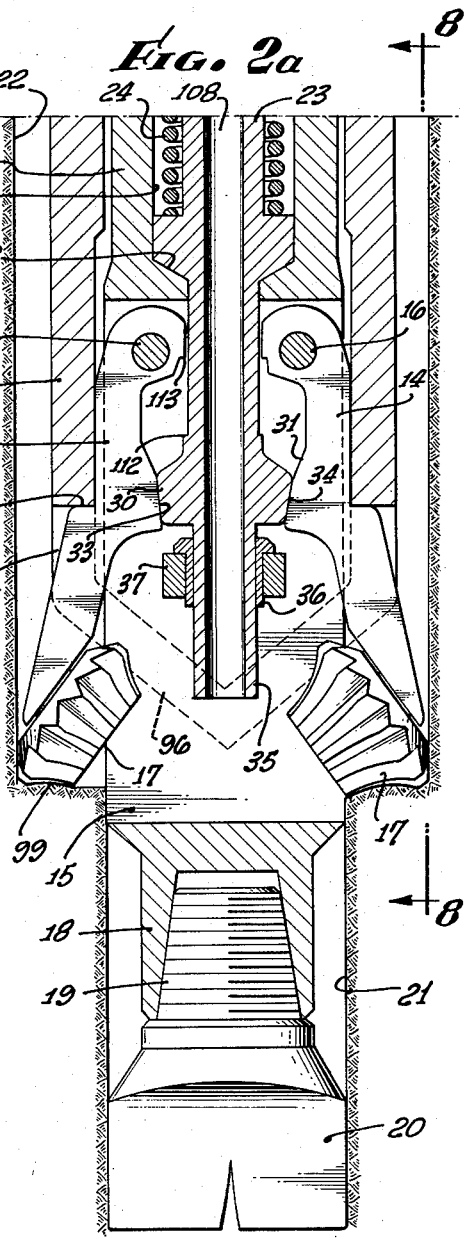
Figure 3:
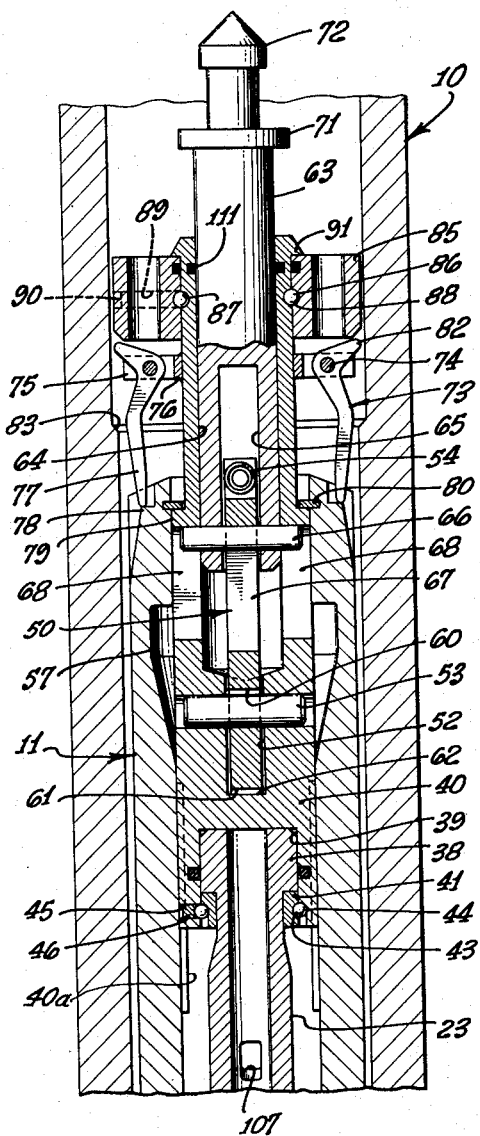
FIG. 3 is a section taken along the line 3—3 on FIG. 1, with certain parts in another relative position.
Figure 4:
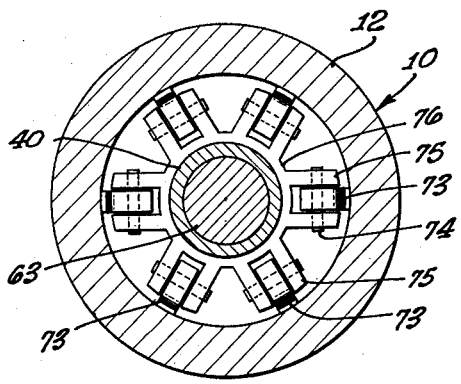
FIG. 4 is a cross-section taken along the line 4—4 on FIG. 2.
Figure 5:
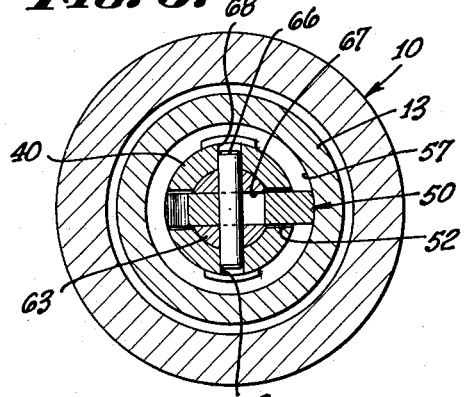
FIG. 5 is a cross-section taken along the line 5—5 on FIG. 2.
Figure 6:
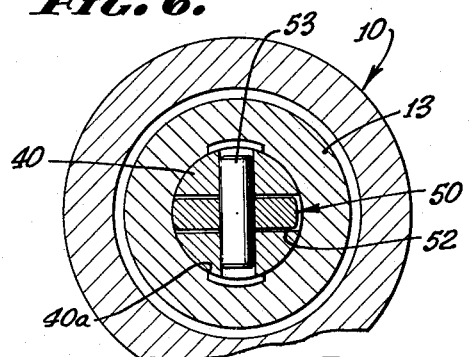
FIG. 6 is a cross-section taken along the line 6—6 on FIG. 2.

In the form of invention illustrated in FIGS. 1 to 8, inclusive, the drill bit 11 includes an elongate main body 13 having a plurality, such as a pair, of cutter supporting members 14 mounted in a body slot 15 on hinge pins 16 suitably secured to the body. A generally conical roller type of toothed cutter 17 is rotatably carried on the lower portion of each cutter arm 14 and initially occupies an inward or retracted position within the confines of the body 13. The lower portion of the body 13 may be constituted as a threaded box 18 adapted to threadedly receive the upper pin end 19 of a lower pilot bit 20 which is adapted to drill the central portion 21 of the well bore (FIG. 2a). The cutters 17 are expandible outwardly to enlarge the well bore drilled by the pilot bit to a diameter 22 that is substantially greater than the outside diameter of the string of drill casing 10 through which the drilling bit 11 is movable.

Outward expansion of the cutters 17 occurs as a result of downward movement of a mandrel 23 within the body 13 of the tool 11. This mandrel is urged in a downward direction by a helical compression spring 24 which surrounds it, the upper end of the spring engaging a spring seat 25 that is prevented from moving upwardly along the body 13 by a suitable split snap retainer ring 26 disposed in a groove 27 in the body and overlying the upper end of the spring seat. The lower end of the spring bears against a spring seat formed by a shoulder or flange 28 forming part of the mandrel 23, which fits within a companion bore 29 in the body 13 of the tool.

When the compression spring 24 is allowed to expand it will move the mandrel 23 downwardly, thereby moving an expander 30 formed on the mandrel downwardly along tapered expander surfaces 31 on the cutter supporting arms 14 to urge the latter and the cutters 17 outwardly. When the mandrel 23 moves downwardly to its fullest extent, as determined by engagement of the flange 28 with a lower stop shoulder 32 on the body, retainer surfaces 33 on the cutter supporting members or arms, which are located below the tapered expander surfaces 31, will engage the periphery 34 of the expander, which will then serve as a lock resisting and precluding inadvertent inward movement of the cutter supporting members 14 and the cutters 17 from their outwardly expanded position.

The lower portion 35 of the mandrel below its expander and the lock 30 is slidable through a bushing 36 mounted within a guide 37 that may be integral with the body and extends across its slot 15; whereas the upper end 38 of the mandrel is piloted within the lower socket or bore 39 of an upper mandrel portion 40, to which it is swivelly secured so that the mandrel portions move longitudinally as a unit, but in which the lower portion can turn arcuately (which need only be to a slight extent) with respect to the upper portion 40 to facilitate proper operation of the apparatus. The lower mandrel portion is retained in the upper mandrel portion by means of a roller bearing device in which the inner race 41 engages a downwardly facing shoulder 42 on the upper mandrel portion, this race contacting a set of balls 43 that ride within an outer raceway 44 formed in the lower part of the upper mandrel member 40. The balls 43 may be inserted in the opposed raceways through a hole 45 that may then be closed by a suitable plug 46 welded to the upper mandrel member 40. The upper member 40 has a non-circular cross-section, fitting within a companion non-circular bore 40a in the body 13 to provide a slidable spline connection between the upper mandrel member and body.

When the spring 24 is allowed to expand for the purpose of shifting the cutters 17 outwardly, it will move the mandrel 23 downwardly within the body 13 to the extent limited by engagement of the mandrel flange 28 with the stop shoulder 32 on the body. When this occurs the cutters are latched in their outward position by a releasable latch device 50 carried by the mandrel. As disclosed in the drawings, such releasable latch device includes a latch 51 disposed in a body slot 52 and pivoted on a hinge pin 53 extending across this slot. The upper part of the latch is urged in an outward direction by a helical compression spring 54 disposed between the upper portion of the mandrel above the slot 52 and a latch ear 55. This spring 54 will urge the upper portion 56 of the latch outwardly into a recess 57 in the body of the tool and under a body shoulder 58, which a latch finger 59 will engage to prevent return or upward movement of the mandrel member 23 within the body 13. When the latch 51 is disposed within the body recess 57, the longitudinal force on the latch is transmitted between the body shoulder 58 and the upper mandrel member 40 directly through the latch 51 and without being imposed on the hinge pin 53. This is due to the fact that the hole 60 in the latch through which the hinge pin 53 passes is elongate so that the pin fits relatively loosely therewithin. When the latch 51 swings outwardly to its latching position against the body shoulder 58, the lower end 61 of the latch engages the lower end 62 of the mandrel defining the body slot 52 therewithin.

The latch 51 is releasable from the shoulder 58 and is swung inwardly from the body 13 back within the confines of the mandrel member 40. This is accomplished through use of a retrieving plunger 63 disposed in the bore 64 of the upper mandrel member 40. The lower end of the plunger has a slot 65 extending therethrough, there being a retrieving pin 66 secured to the plunger and extending through an opening 67 in the latch, this pin being guided for straight line movement within the mandrel 23 by being received in longitudinal slots 68 on opposite sides of the mandrel bore 64. When the plunger 63 is in its downward position, its pin 66 is on the right side (as disclosed in FIGS. 1 and 2) of the latch opening 67, the lower part of this opening being much wider than the pin diameter. The spring 54 can, therefore, swing the latch 51 outwardly when the mandrel 23 moves downwardly within the body 13 to move the latch 51 into the body recess 57 and under the latch shoulder 58 (FIG. 2). When this occurs, the retrieving pin 66 is disposed adjacent the lower end of the left side 70 of the latch opening, so that upward movement of the plunger 63 will cause the pin 66 to engage the tapered left side 70 and swing the latch 51 out of the body recess 57 and back to its retracted position within the upper mandrel member 40.

Downward movement of the plunger 63 within the mandrel member 40 is limited by engagement of the plunger flange 71 with the upper end of the mandrel, whereas its upward movement is determined by engagement of the retrieving pin 66 with the upper ends of the longitudinal mandrel slots 68. The plunger 63 is initially disposed in its lower position during lowering of the drill bit 11 through the well casing 10, and it may be elevated by means of a suitable overshot (not shown) attached to a wire line (not shown), which can be coupled to a head 72 at the upper end of the retrieving plunger 63, to move the latch 51 from its expanded to its retracted position within the mandrel 40.

The compression spring 24 is maintained in its stressed state during lowering of the drilling apparatus down through the casing by a plurality of holding elements 73, each of which is mounted on a hinge or fulcrum pin 74 secured to arms 75 extending outwardly from a ring 76 welded to the upper mandrel member 40 above the upper end of the bit body 13. These holding elements 73 include depending legs 77 which engage upwardly facing holding shoulders 78 at the upper portion of the body. When in this position, the mandrel 23 cannot be shifted downwardly in the body 13 by the spring 24, and, instead, will occupy its upper position, as limited by engagement of a mandrel shoulder 79 with a retainer ring 80, which may be a split snap ring fitting within an internal circumferential groove 81 in the body of the tool.

The holding elements 73 are released, to permit the spring 24 to expand, after the lower portion of the drill bit 11 and its cutters 17 are disposed below the lower terminus of the casing string 10, by engagement of outwardly extending fingers 82 on the holding elements with a tapered stop shoulder 83 on the casing string or shoe. It is apparent that as these fingers 82 move down along the shoulder 83 they will swing upwardly, resulting in an outward shifting of the holding element legs 77 from the body shoulder 78, whereupon the spring 24 can expand and shift the mandrel 23 downwardly of the body 13, to cause the expander and lock 30 to expand the cutter arms 14 and cutters 17 outwardly to the extent limited by engagement of the periphery 34 of the lock with the companion lock surfaces 33 on the cutter supporting members.

Downward movement of the mandrel 23 of the tool in the casing 10 is limited by engagement of a stop ring 85 on the upper portion of the mandrel with the stop shoulder 83 of the casing or pipe 10. This ring has an external diameter greater than the internal diameter of the casing below the stop shoulder 83. It is swively secured on the upper mandrel member 40 by means of balls 86 extending circumferentially around a mandrel raceway 87 and a companion raceway 88 in the stop ring. Engagement of the ring 85 with the stop shoulder 83 will not prevent arcuate movement of the mandrel 23 and the body 13 of the tool, in order that the cutter supporting members 14 can be appropriately coupled to the lower portion 12 of the casing, as explained hereinbelow. The appropriate location of the raceways 87, 88 opposite one another, so that the balls 86 can be inserted in place through a hole 89 in the mandrel which is then closed by a plug 90, is determined by engagement of the upper end of the stop ring 85 with an outwardly directed flange 91 at the upper end of the upper mandrel member 40.

When the stop ring 85 engages the stop shoulder 83, which will occur shortly after the holding elements 73 have been released from the body 13 of the tool, the spring 24 will be urging the mandrel 23 downwardly of the body and against the expander surfaces 31 on the cutter arms 14. At this time, the cutter arms 14 are disposed within and also project below opposed downwardly opening slots 95 in the casing (FIG. 8), the lower sides 96 of each slot diverging in a downward direction and the upper sides 97 of each slot being substantially parallel to one another, terminating at a shoulder 98 that lies in the plane substantially normal to the axis of the apparatus. As the spring 24 expands the arms 14 outwardly, the casing 10 is rotated, the trailing sides of the slots 95 engaging the cutter supporting arms and rotating the arms 14 as well as the cutters 17, which will dig into any formation that they encounter and effect its removal. As the hole is enlarged (without moving the casing string 10 downwardly), the spring 24, acting through the mandrel 23, forces the cutter arms 14 outwardly to greater extents, until they reach their maximum outwardly expanded position in which the peripheral lock surfaces 34 of the mandrel engage the companion lock surfaces 33 on the cutter supporting arms. At this time, the supporting arms 14 will be disposed within the upper portions 97 of the casing slots, being guided thereinto, if they have been previously disaligned therewith, by the tapered sides 96 of the lower portions of the slots. The cutters 17 will have produced a transverse annular shoulder 99 in the formation, whereupon the imposition of downweight on the casing string 10 will cause the upper ends 98 of the casing slots to engage companion upwardly facing drilling weight shoulders 100 on the cutter supporting members, so that the drilling weight is transmitted from the casing 10 directly to these shoulders 100 and the supporting members 14, causing the latter to urge the cutters 17 against the formation shoulder 99. The drilling torque is transmitted directly from the sides 97 of the slots to the cutter supporting arms 14 and cutters 17.

Rotation of the casing string 10 and of the cutter supporting arms 14 and cutters 17 will continue to effect a removal of the annulus or formation material which surrounds the pilot hole 21 drilled by the pilot bit. The cuttings are removed by pumping drilling mud, or the like, downwardly through the casing string 10 which will pass through a plurality of longitudinal ports or passages 105 in the stop ring 85, then continuing around the exterior of the body 13 and in through side ports 106 in the body that communicate with side ports 107 in the lower mandrel member 23 opening into the central passage 108 in this member, the fluid discharging through the lower end of this mandrel member into the body slot 15, and then flowing outwardly around the cutters 17 and the formation shoulder 99, commingling with the cuttings produced by the cutters and carrying them upwardly around the exterior of the casing 10 to the top of the well bore.

In order to prevent the drilling fluid from entering the annulus between the lower mandrel member 23 and body 13 containing the spring 24, the upper spring seat 25 may have inner and outer side seals 109 thereon engaging the periphery of the lower mandrel member 23 and the inner wall of the body. Similarly, a side seal 110 is provided between the upper and lower mandrel members 23, 40. Side seals 111 are also disposed between the stop ring 85 and the mandrel member 40 and this mandrel member and the retrieving plunger 63. These latter seals are provided above the swivel ball members 86, so as to minimize the opportunity of drilling mud and foreign substances resisting arcuate movement of the mandrel 40, 23 within the stop ring 85.

In the event that the cutters 17 are elevated from the formation shoulder, as might occur in adding additional sections of casing to the drill string at the top of the well bore, the cutters are prevented from retracting even partially from their fully expanded position. This is due to the outward shifting of the latch 51 into the body recess 57 and under the latch shoulder 58 following outward expansion of the cutters to their maximum extent. Thus, the cutters will remain in their outward expanded position so that subsequent relowering of the casing string 10 can be had with assurance that the cutters will continue to enlarge the well bore to the desired diameter, which is substantially greater than the external diameter of the casing string.

When the drill bit apparatus is to be removed from the well casing, a suitable overshot (not shown) is lowered on a wire sand line or the like (not shown) down through the casing 10, and will couple itself to the head 72 of the retrieving plunger 63 (all in a well-known manner). The taking of an upward pull on the wire line will move the plunger 63 upwardly, which will cause the retrieving pin 66 to engage the left side 70 of the latch slot 67, shifting the latch 51 inwardly fully within the confines of the mandrel 40. The upward movement on the plunger 63 will then be transmitted through its pin 66 to the mandrel 40, 23, moving the mandrel upwardly against the force of the spring 24, the body then being prevented from moving upwardly by virtue of the fact that the cutter supporting member shoulders 100 are engaging the casing shoulders 98. The mandrel 23 is shifted upwardly against the action of the spring 24 to further compress the latter, until the expander and lock portion 30 of the mandrel is disposed above the lock and expander surfaces 31 on the cutter supporting members. Continued upward movement of the mandrel 23 will cause an upwardly facing shoulder 112 on the mandrel to contact inwardly directed relatively short arms 113 on the cutter supporting members 14, causing such short arms to swing the supporting members about their hinge pins 16 and in an inward direction, to place the cutters 17 inwardly of the casing 10 and substantially within the confines of the drill bit body 13. The entire drill bit 11 is now moved upwardly within the casing 10, the cutter supporting arms 14 riding upwardly along the wall of the casing. The elevation of the wire line continues to bring the entire drilling apparatus to the top of the well casing 10, where it can be replaced by a similar drill bit or in which the worn cutters can be replaced and the bit relowered through the well casing 10, with the holding elements 73 again retaining the spring 24 in its compressed condition. The cutter supporting members 14 and cutters 17 will remain inherently in their retracted positions.

When the new or reconditioned drill bit again reaches the lower end of the casing 10, the fingers 82 will again engage the stop shoulder 83 to release the mandrel 23, permitting the spring 24 to expand and the cutters 17 to be shifted outwardly to their expanded position within the casing slots 95. Drilling weight can now be imposed on the casing 10 and the latter rotated to continue the drilling of the well bore.

Retrievable drill bits are lowered within and elevated through the well casing 10 as often as required, until the hole is drilled to the desired depth. When this occurs, the drill bit is retrieved from the well casing and the latter can be cemented in place, if desired.

In the form of invention illustrated in FIGS. 9 to 11, inclusive, substantially the same mechanism is employed for expanding the cutter arms 14a and cutters 17 and for latching them in their outwardly expanded position. The expansion of the spring 24 is also prevented initially by the same holding elements 73 pivotally mounted on the mandrel 40b and engaging the upper portion 78 of the drill bit body 13. However, in lieu of the drilling weight and torque being transmitted directly from the casing string 10a to the cutter supporting members 14a, the drilling torque and weight is transmitted from the casing to the mandrel 40b, 23, and from the latter to the body 13 of the tool, and thence to the cutter supporting members 14a, which, when expanded outwardly, will engage body stop shoulders 120 on the sides of the body slot 15, in the manner disclosed in United States Patent No. 2,809,016.

As disclosed in FIGS. 9 to 11, the upper mandrel member 40b has a stop ring 85a integral therewith, this stop ring being engageable with the casing stop shoulder 83. Above this stop ring the upper mandrel member 40b is provided with a head 121 having slots 122 extending transversely thereof and receiving a pair of oppositely directed driving or coupling dogs 123 which are pivotally mounted on pins 124 secured to the head. Each latch or dog 123 is urged in an outward direction by a compression spring 125, one end of which engages the head 121 and the other end of which engages an upper lug 126 on the driving dog to urge the upper, outer portion 127 of the driving dog outwardly into a recess 128 in the casing shoe 12a, with which the driving dogs become aligned when the stop ring 85a engages the stop shoulder 83. Companion dogs 129 are provided in this recess which will engage the driving dogs 123, so that the rotational effort of the casing string 10a is transferred to the dogs, the latter engaging the sides of the mandrel slots 122 to rotate the mandrel 40 which has a slidable spline connection 40a to the body of the tool.

Downward drilling weight is also transferred through the downwardly facing shoulder 130 defining the upper end of the casing recess and which engages the upper ends of the dogs 123. From the dogs, the downward drilling weight is transmitted through the mandrel 40, 23 and its lower flange 28 to the body 13 of the tool, and from the body of the tool through the body stop shoulders 120 to the companion shoulders 120a on the cutter supporting members 14a.

The retrieving plunger 63a has a second or upper retrieving pin 135 therein extending through openings 67a in the driving dogs 123. When the dogs swing outwardly into the casing recess 128, the upper retrieving pin 135 will be disposed at the lower ends of the openings 67a and in a position to engage the inclined sides 70a of the openings, such that upward movement of the plunger 63a within the mandrel 40b will cause the upper pin 135 to retract the dogs 123 from the casing recess 128 at substantially the same time that the lower retracting pin 66 is removing the latch 51 from the body recess 57. When the dogs 123 and latch 51 have been retracted, the plunger 63a is movable upwardly, through use of the wire line and overshot previously referred to, to elevate the mandrel 40b, 23 and the body 13 of the tool within the casing 10a. When the cutter arms 14a engage the lower end 136 of the casing they will resist upward movement of the body 13 of the tool, whereupon the mandrel 23 is shifted upwardly within the body to compress the spring 24 and move the expander and lock device 30 above the expander surfaces 31 of the cutter supporting members, the mandrel shoulder 112 then engaging the short arms 113 on the supporting members to swing the latter and the cutters 17 inwardly within the body slot 15, the entire bit apparatus then being capable of passing upwardly into the casing string to be elevated therewithin to the top of the well bore.

The inventors claim:

1. In a retrievable drilling bit adapted to be lowered within and coupled to the lower portion of a string of pipe disposed in a well bore: a unitary body movable longitudinally through the pipe; a plurality of initially retracted cutter means mounted on and circumferentially spaced about said body for expansion laterally outwardly of said body; said bit including means adapted to engage a lower portion of the pipe to locate the bit in the pipe with said cutter means projecting below the lower end of the pipe; means carried by said body for expanding said cutter means from its initially retracted position laterally outwardly of the body to drill an effective hole diameter greater than the outside diameter of the pipe; and means for coupling said expanding means to the pipe, whereby the pipe is adapted to rotate the bit and transmit torque through said expanding means and body to said cutter means.

2. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; means movable longitudinally in said body and engageable with said cutter means for expanding said cutter means laterally outwardly of the body to drill an effective hole diameter greater than the outside diameter of the pipe; and means for coupling said expanding means to the pipe, whereby the pipe is adapted to rotate the bit; said locating means including a member mounted on said expanding means and engageable with the pipe to prevent further downward movement of said expanding means in the pipe.

3. In a retrievable drilling bit adapted to be lowered within and coupled to the lower portion of a string of pipe disposed in a well bore: a unitary body movable longitudinally through the pipe; a plurality of initially retracted cutter means mounted on and circumferentially spaced about said body for expansion laterally outwardly of said body; said bit including means adapted to engage a lower portion of the pipe to locate the bit in the pipe with said cutter means projecting below the lower end of the pipe; means movable in one direction longitudinally in said body and engageable with said cutter means for expanding said cutter means from its initially retracted position laterally outwardly of the body to drill an effective hole diameter greater than the outside diameter of the pipe; releasable latch means for preventing movement of said expanding means in the opposite longitudinal direction after expansion of said cutter means; and means for coupling the bit to the pipe, whereby the pipe is adapted to rotate the bit.

4. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; means movable in one direction longitudinally in said body and engageable with said cutter means for expanding said cutter means from its initially retracted position laterally outwardly of the body to drill an effective hole diameter greater than the outside diameter of the pipe; releasable latch means for preventing movement of said expanding means in the opposite longitudinal direction after expansion of said cutter means; and means for coupling the cutter means directly to the pipe, whereby the pipe transmits its rotary motion and torque directly to the cutter means.

5. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; means for expanding said cutter means laterally outwardly of the body to drill an effective hole diameter greater than the outside diameter of the pipe; said locating means including a member mounted on said expanding means and engageable with the pipe to prevent further downward movement of said expanding means in the pipe; and means for coupling the cutter means directly to the pipe, whereby the pipe transmits its rotary motion and torque directly to the cutter means.

6. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; means for expanding said cutter means laterally outwardly of the body to drill an effective hole diameter greater than the outside diameter of the pipe; means for coupling the bit to the pipe, whereby the pipe is adapted to rotate the bit; and releasable holding means for preventing operation of said expanding means during lowering of the bit through the pipe, said holding means being engageable with a portion of the pipe to be shifted by such pipe portion to a released condition and permit operation of said expanding means.

7. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; means including a mandrel movable relatively downwardly in said body and engaging said cutter means to expand said cutter means laterally outwardly of the body to drill an effective hole diameter greater than the outside diameter of the pipe; means for coupling the bit to the pipe, whereby the pipe is adapted to rotate the bit; and means for relatively elevating the mandrel in said body to permit retraction of said cutter means; said locating means including a member mounted on said mandrel and engageable with the lower portion of the pipe to prevent further downward movement of said mandrel in the pipe.

8. In a retrievable drilling bit adapted to be lowered within and coupled to the lower portion of a string of pipe disposed in a well bore: a unitary body movable longitudinally through the pipe; a plurality of initially retracted cutter means mounted on and circumferentially spaced about said body for expansion laterally outwardly of said body; said bit including means adapted to engage a lower portion of the pipe to locate the bit in the pipe with said cutter means projecting below the lower end of the pipe; means including a mandrel movable relatively downwardly in said body and engaging said cutter means to expand said cutter means from its initially retracted position laterally outwardly of the body to drill an effective hole diameter greater than the outside diameter of the pipe; means for coupling the bit to the pipe, whereby the pipe is adapted to rotate the bit; releasable latch means for preventing upward movement of said mandrel after said cutter means has been expanded outwardly; and means for releasing said latch means and for relatively elevating the mandrel in said body to permit retraction of said cutter means.

9. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; means including a mandrel movable relatively downwardly in said body and engaging said cutter means to expand said cutter means laterally outwardly of the body to drill an effective hole diameter greater than the outside diameter of the pipe; means for coupling the bit to the pipe, whereby the pipe is adpted to rotate the bit; means for relatively elevating the mandrel in said body to permit retraction of said cutter means; and releasable holding means engaging said mandrel and body to prevent relative downward movement of said mandrel in said body during lowering of the bit through the pipe, said holding means being engageable with a portion of the pipe to be shifted by such pipe portion to a released condition and permit such relative downward movement of said mandrel.

10. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; means including a mandrel movable relatively downwardly in said body and engaging said cutter means to expand said cutter means laterally outwardly of the body to drill an effective hole diameter greater than the outside diameter of the pipe; means for coupling the bit to the pipe, whereby the pipe is adapted to rotate the bit; means for relatively elevating the mandrel in said body to permit retraction of said cutter means; releasable holding means engaging said mandrel and body to prevent relative downward movement of said mandrel in said body during lowering of the bit through the pipe, said holding means being released upon engaging a portion of the pipe to permit such relative downward movement of said mandrel; releasable latch means for preventing upward movement of said mandrel after said cutter means has been expanded outwardly; and means for releasing said latch means and for relatively elevating the mandrel in said body to permit retraction of said cutter means.

11. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; a mandrel movable relatively downwardly in said body and engaging said cutter means to expand said cutter means laterally outwardly of the body to drill an effective hole diameter greater than the outside diameter of the pipe; spring means for moving said mandrel relatively downwardly in said body; releasable holding means engaging said mandrel and body to prevent operation of said spring means; said holding means including instrumentalities engageable with the pipe to be shifted by the pipe to a released condition; means for coupling the bit to the pipe, whereby the pipe is adapted to rotate the bit; and means for relatively elevating said mandrel in said body to permit retraction of said cutter means.

12. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; a mandrel movable relatively downwardly in said body and engaging said cutter means to expand said cutter means laterally outwardly of the body to drill an effective hole diameter greater than the outside diameter of the pipe; spring means for moving said mandrel relatively downwardly in said body; releasable holding means engaging said mandrel and body to prevent operation of said spring means; said holding means including instrumentalities engageable with the pipe to be shifted by the pipe to a released condition; means for coupling said cutter means directly to the pipe whereby the pipe is adapted to rotate the bit; and means for relatively elevating said mandrel in said body to permit retraction of said cutter means out of coupling relation to the pipe.

13. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; a mandrel movable relatively downwardly in said body in torque transmitting relation thereto and engaging said cutter means to expand said cutter means laterally outwardly of the body to drill an effective hole diameter greater than the outside diameter of the pipe; spring means for moving said mandrel relatively downwardly in said body; releasable holding means engaging said mandrel and body to prevent operation of said spring means; means for coupling said mandrel to the pipe, whereby the pipe is adapted to rotate the bit; and means for relatively elevating said mandrel in said body to permit retraction of said cutter means.

14. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; a mandrel movable relatively downwardly in said body and engaging said cutter means to expand said cutter means laterally outwardly of the body to drill an effective hole diameter greater than the outside diameter of the pipe; spring means for moving said mandrel relatively downwardly in said body; releasable holding means engaging said mandrel and body to prevent operation of said spring means; means for coupling the bit to the pipe, whereby the pipe is adapted to rotate the bit; releasable latch means for preventing upward movement of said mandrel after said cutter means has been expanded outwardly; and means for releasing said latch means and for relatively elevating said mandrel in said body to permit retraction of said cutter means.

15. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; a mandrel movable relatively downwardly in said body and engaging said cutter means to expand said cutter means laterally outwardly of the body to drill an effective hole diameter greater than the outside diameter of the pipe; spring means for moving said mandrel relatively downwardly in said body; releasable holding means engaging said mandrel and body to prevent operation of said spring means; means for coupling said cutter means directly to the pipe whereby the pipe is adapted to rotate the bit; releasable latch means acting between said mandrel and body for preventing upward movement of said mandrel after said cutter means has been expanded outwardly; and means for releasing said latch means and for relatively elevating said mandrel in said body to permit retraction of said cutter means out of coupling relation to the pipe.

16. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; a mandrel movable relatively downwardly in said body in torque transmitting relation thereto and engaging said cuter means to expand said cutter means laterally outwardly of the body to drill an effective hole diameter greater than the outside diameter of the pipe; spring means for moving said mandrel relatively downwardly in said body; releasable holding means engaging said mandrel and body to prevent operation of said spring means; means for coupling said mandrel to the pipe, whereby the pipe is adapted to rotate the bit; releasable latch means for preventing upward movement of said mandrel after said cutter means has been expanded outwardly; and means for releasing said latch means and for relatively elevating the mandrel in said body to permit retraction of said cutter means.

17. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; a mandrel movable relatively downwardly in said body in torque transmitting relation thereto and engaging said cutter means to expand said cutter means laterally outwardly of the body to drill an effective hole diameter greater than the outside diameter of the pipe; spring means for moving said mandrel relatively downwardly in said body; releasable holding means engaging said mandrel and body to prevent operation of said spring means; coupling means on said mandrel expandible outwardly into coupling relation with the pipe, whereby the pipe is adapted to rotate the bit; means for releasing said coupling means from the pipe; and means for relatively elevating said mandrel in said body to permit retraction of said cutter means.

18. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; a mandrel movable relatively downwardly in said body in torque transmitting relation thereto and engaging said cutter means to expand said cutter means laterally outwardly of the body to drill an effective hole diameter greater than the outside diameter of the pipe; spring means for moving said mandrel relatively downwardly in said body; releasable holding means engaging said mandrel and body to prevent operation of said spring means; coupling means on said mandrel expandible outwardly into coupling relation with the pipe, whereby the pipe is adapted to rotate the bit; releasable latch means acting between said mandrel and body for preventing upward movement of said mandrel after said cutter means has been expanded outwardly; and means projecting upwardly from and movable upwardly with respect to said mandrel for releasing said coupling means from the pipe and for releasing said latch means and for relatively elevating the mandrel in said body to permit retraction of said cutter means.

19. In a retrievable drilling bit adapted to be lowered within and coupled to the lower portion of a string of pipe disposed in a well bore: a body movable longitudinally through the pipe; initially retracted cutter means mounted on said body for expansion laterally outwardly of said body; said bit including means adapted to engage a lower portion of the pipe to locate the bit in the pipe with said cutter means projecting below the lower end of the pipe; a mandrel movable relatively downwardly in said body in torque transmitting relation thereto and engaging said cutter means to expand said cutter means laterally outwardly of the body to drill an effective hole diameter greater than the outside diameter of the pipe; spring means for moving said mandrel relatively downwardly in said body; releasable holding means engaging said mandrel and body to prevent operation of said spring means; coupling means on said mandrel expandible outwardly into coupling relation with the pipe, whereby the pipe is adapted to rotate the bit; releasable latch means acting between said mandrel and body for preventing upward movement of said mandrel after said cutter means has been expanded outwardly; means projecting upwardly from and movable upwardly with respect to said mandrel for releasing said coupling means from the pipe and for releasing said latch means and for relatively elevating the mandrel in said body to permit retraction of said cutter means; and releasable holding means for preventing downward movement of said mandrel in said body during lowering of the bit through the pipe, said holding means being released upon engaging a portion of the pipe to permit downward movement of said mandrel under the influence of said spring means.

References Cited in the file of this patent
UNITED STATES PATENTS

| | | |
|---|---|---|
| 1,832,129 | Knaur | Nov. 17, 1931 |
| 1,909,817 | Dodds | May 16, 1933 |
| 2,144,687 | Pippir | Jan. 24, 1939 |
| 2,173,018 | Hurley | Sept. 12, 1939 |
| 2,184,361 | Noble | Dec. 26, 1939 |
| 2,755,071 | Kammerer | July 17, 1956 |
| 2,764,388 | Camp | Sept. 25, 1956 |
| 2,771,275 | Ortloff | Nov. 20, 1956 |